United States Patent
Periyasamy

(10) Patent No.: US 8,561,050 B2
(45) Date of Patent: Oct. 15, 2013

(54) METHOD AND SYSTEM FOR UPDATING AN APPLICATION

(75) Inventor: Palanisamy Periyasamy, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1901 days.

(21) Appl. No.: 11/582,345

(22) Filed: Oct. 18, 2006

(65) Prior Publication Data

US 2007/0106701 A1    May 10, 2007

(30) Foreign Application Priority Data

Nov. 10, 2005   (IN) .................. IN3004/DEL/2005

(51) Int. Cl.
*G06F 9/44*       (2006.01)
*G09G 5/36*       (2006.01)
*G09G 5/00*       (2006.01)

(52) U.S. Cl.
USPC ........... 717/168; 717/169; 717/170; 717/171; 345/545; 345/629

(58) Field of Classification Search
None
See application file for complete search history.

(56) References Cited

U.S. PATENT DOCUMENTS

| | | | |
|---|---|---|---|
| 6,360,363 B1 * | 3/2002 | Moser et al. .................. | 717/170 |
| 6,378,068 B1 * | 4/2002 | Foster et al. ...................... | 713/1 |
| 6,385,770 B1 * | 5/2002 | Sinander ...................... | 717/170 |
| 6,425,125 B1 * | 7/2002 | Fries et al. ..................... | 717/168 |
| 6,430,738 B1 * | 8/2002 | Gross et al. ..................... | 717/176 |
| 6,434,744 B1 * | 8/2002 | Chamberlain et al. ........ | 717/168 |
| 7,000,220 B1 * | 2/2006 | Booth .......................... | 717/110 |
| 7,017,151 B1 * | 3/2006 | Lopez et al. ................... | 717/127 |
| 7,089,548 B2 * | 8/2006 | Lin ............................... | 717/168 |
| 7,089,550 B2 * | 8/2006 | Bakke et al. ................... | 717/173 |
| 7,266,816 B1 * | 9/2007 | Sharma et al. ................ | 717/170 |
| 7,595,810 B2 * | 9/2009 | Louch ........................... | 345/629 |
| 7,757,217 B2 * | 7/2010 | Sivaram ........................ | 717/128 |
| 7,886,287 B1 * | 2/2011 | Davda ........................... | 717/168 |
| 8,020,158 B2 * | 9/2011 | Xie et al. ....................... | 717/171 |
| 2002/0065947 A1 * | 5/2002 | Wishoff et al. ................ | 709/317 |
| 2004/0139175 A1 * | 7/2004 | Lin ............................... | 709/220 |
| 2004/0210890 A1 * | 10/2004 | Armstrong et al. ............ | 717/168 |
| 2005/0203975 A1 * | 9/2005 | Jindal et al. ................... | 707/204 |
| 2006/0041866 A1 * | 2/2006 | Sivaram ........................ | 717/124 |
| 2006/0089939 A1 * | 4/2006 | Broda et al. ................... | 707/100 |
| 2006/0184930 A1 * | 8/2006 | Fuente et al. ................. | 717/168 |
| 2006/0288341 A1 * | 12/2006 | Wurden et al. ................ | 717/168 |
| 2009/0259999 A1 * | 10/2009 | Srinivasan .................... | 717/170 |
| 2009/0271779 A1 * | 10/2009 | Clark ............................ | 717/171 |
| 2011/0321027 A1 * | 12/2011 | Andrews et al. .............. | 717/169 |
| 2012/0154415 A1 * | 6/2012 | Brunner et al. ............... | 345/545 |
| 2012/0174086 A1 * | 7/2012 | Raju et al. ..................... | 717/168 |

OTHER PUBLICATIONS

Haibo Chen et al., "POLUS: A Powerful Live Updating System", [Online], 2007, pp. 1-10, [Retrieved form Internet on Jun. 27, 2013] <http://citeseerx.ist.psu.edu/viewdoc/download?doi=10.1.1.167.3843&rep=rep1&type=pdf>.*

(Continued)

*Primary Examiner* — Thuy Dao
*Assistant Examiner* — Ziaul A Chowdhury

(57) ABSTRACT

The patching of applications is achieved by performing application updates in one file system view, while the application is running in another view. A patch user copies any files that are to be modified, performs the modification on the copies, and switches all users to the patch view once all modifications are complete.

13 Claims, 5 Drawing Sheets

(56) References Cited

OTHER PUBLICATIONS

Bryan Buck et al., "An API for Runtime Code Patching", [Online], 2000, pp. 317-329, [Retrieved from Internet on Jun. 27, 2013], <http://hpc.sagepub.com/content/14/4/317.full.pdf>.*

M. Dmitriev, "Towards Flexible and Safe Technology for Runtime Evolution of Java Language Applications", [Online], 2001, pp. 1-7, [Retrieved from Internet on Jun. 27, 2013], <http://citeseerx.ist.psu.edu/viewdoc/download?doi=10.1.1.63.7477&rep=rep1&type=pdf>.*

Stelios Sidiroglou et al., "Band-aid Patching"[Online], 2007, pp. 1-5, [Retrieved form Internet on Jun. 27, 2013], <http://academiccommons.columbia.edu/download/fedora_content/download/ac:149514/CONTENT/bandaid.pdf>.*

* cited by examiner

METHOD AND SYSTEM FOR UPDATING AN APPLICATION

BACKGROUND OF THE INVENTION

One of the primary concerns of software consumers, and in particular enterprise application customers, is patch management. In general terms, enterprise applications are applications used in a business environment, for which high availability and low maintenance are important goals. The maintenance of application software tends to be carried out by the application of numerous patch releases, each patch providing bug fixes, improvements in functionality, security enhancements and so on.

However, current methods of patching enterprise applications create many hours of downtime and there is no guarantee that the patched system will work correctly. Incorrect patches result in the application having to be restored from backup, so further increasing application downtime.

BRIEF DESCRIPTION OF THE DRAWINGS

Embodiments of the invention will now be described, by way of example only, with reference to the accompanying drawings in which.

DETAILED DESCRIPTION OF EMBODIMENTS OF THE INVENTION

Figure 1:
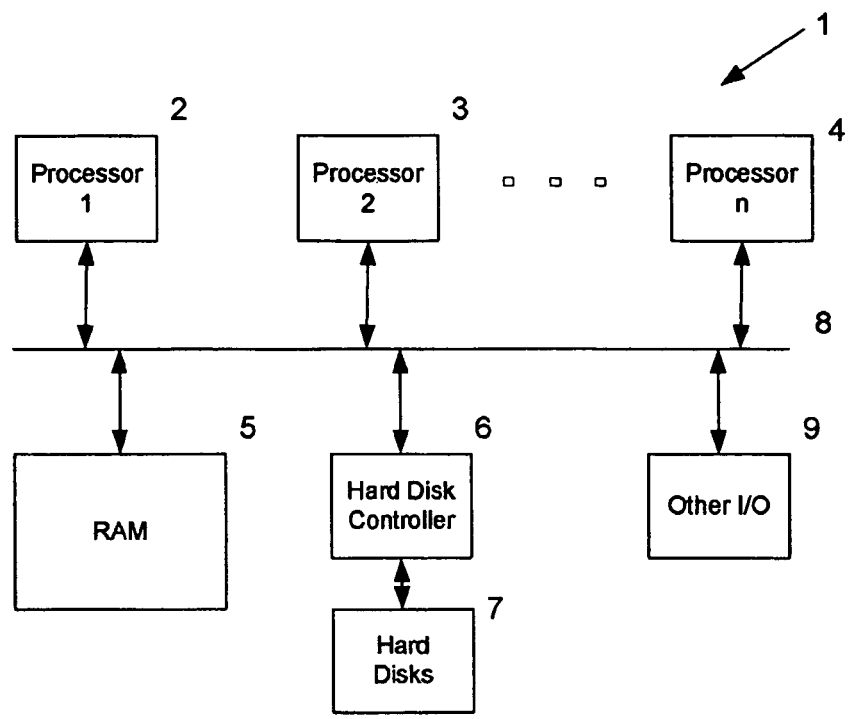
FIG. 1 is a schematic diagram illustrating a conventional computer system.

There will be described a method of updating an application that comprises a plurality of files, the files being accessible to a first user, wherein the step of updating the application includes modifying one or more of the plurality of files, the method comprising creating a copy of each of the files to be modified, modifying each of the copies and associating the copies with a second user. By modifying copies of the files only, the application can be updated without requiring it to be stopped. Users can continue to use the application while it is being patched. Once the patch process is complete, the users can be switched to using the patched files, with minimal downtime, since execution of the application can be stopped just before switching and the application can be re-started immediately after switching. The first user may comprise a plurality of users configured to use the application while it is being updated. The second user may comprise a patch user for applying updates to the application while it is running. The files may be accessible to the first user through a first file system view and the copies of the files may be accessible to the second user through a second file system view, while still using the same path and file name.

The step of making the copies of the files accessible to the first user may comprise switching the file system view, so that the first user is associated with the second file system view. The method may further comprise merging the first and second file system views, which may involve determining whether a copy of a file exists in the second file system view, and in the event that it does, associating the file from which the copy was made to the backup view and associating the copy of the file with the first file system view. The step of associating a file with a file system view may comprise renaming the file according to a predetermined file format, the file format specifying the view.

There will also be described a method of patching an application that comprises a plurality of files, the files being associated with a first file system view, the method comprising associating a user of the application with the first file system view; and while the application is running, executing the steps of creating a copy of each of the files to be patched, modifying each of the copies and associating the copies with a second file system view. The method may further comprise stopping the application, associating the user with the second file system view and re-starting the application.

Also described is a method of switching between a plurality of application versions, each application version comprising a plurality of files, the method comprising assigning the files belonging to different application versions to respective file system views and switching between file system views to switch between application versions. The method may further comprise terminating execution of a current application version prior to switching between the file system views, and executing a new application version after switching the file system view to the new version.

The current application version may comprise a patched version, and the new application version may comprises a version of the patched version prior to the patch being applied, wherein the step of switching between file system views comprises rolling back a patch. Since switching between views takes very little time, examples of the invention provide the ability to perform almost instant patch recalls and patch deletion, as well as almost instant switching between different application versions.

FIG. 1 is a schematic diagram of a conventional symmetric multiprocessor system 1 comprising a plurality of processors 2, 3, 4, main memory 5, for example in the form of dynamic random access memory (RAM) and a hard disk controller 6 controlling one or more hard disks 7, interconnected by a bus 8. Such a system typically also includes a variety of other I/O subsystems 9 required for operation of the system, as would be apparent to a person skilled in the art.

Figure 2:
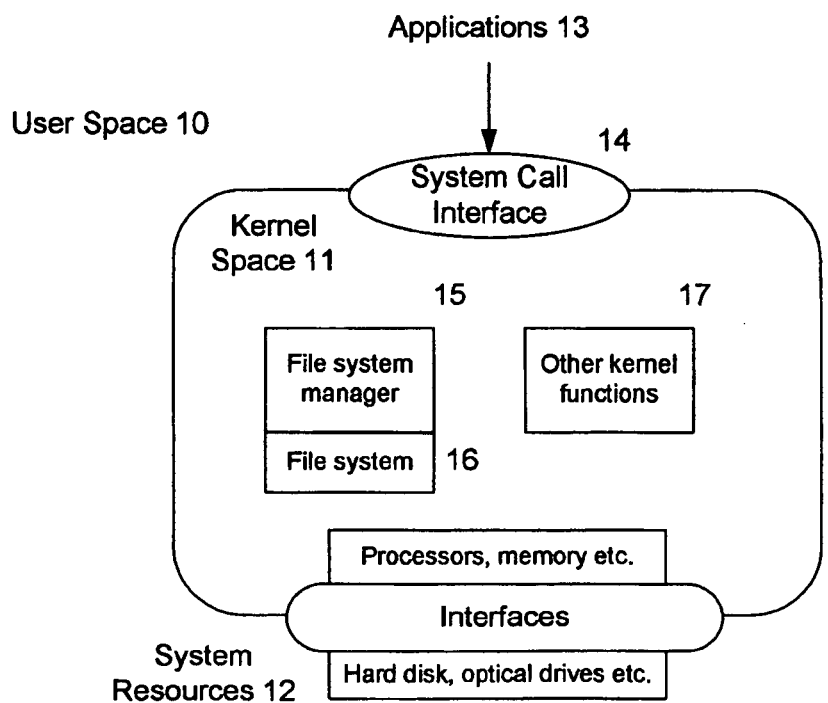
FIG. 2 is a schematic diagram illustrating the relationship between users, operating system and system resources in the system of FIG. 1.

FIG. 2 illustrates an example operating system environment, for example based on the HP-UX™ operating system, divided into a user space 10, kernel space 11 and system resources 12. The user space 10 includes applications 13 running on the system that access the kernel via a system call interface 14. The kernel space 11 includes a file system manager module 15 that controls the organisation of files in memory and on hard disk in accordance with a file system 16. The kernel includes many other functions and modules 17, including memory management, I/O drivers and so on, that are well known and will not be described further in detail.

System resources 12 accessed by the kernel include the disks 7 and memory 5.

Figure 3:
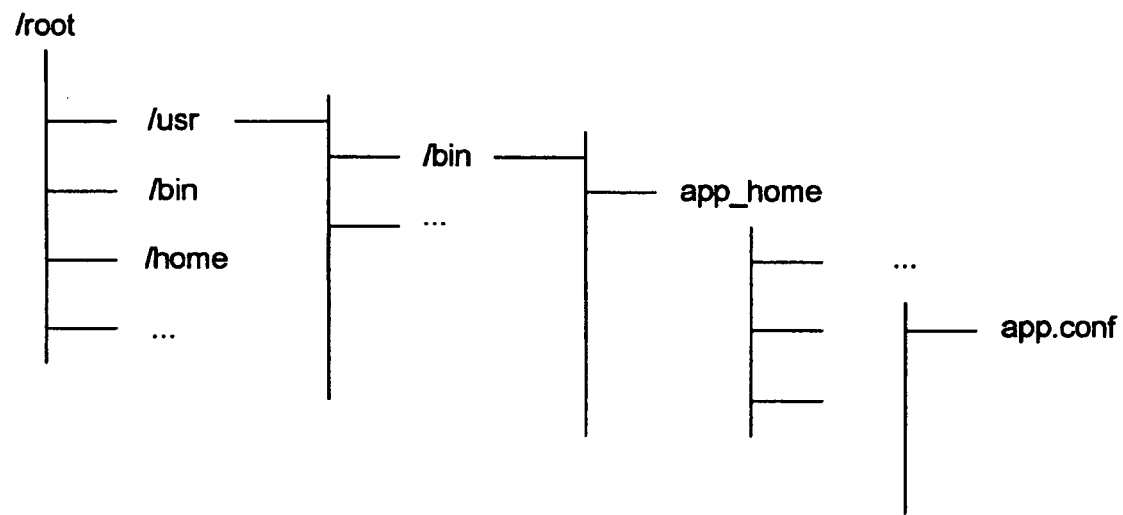
FIG. 3 illustrates an example file system structure.

FIG. 3 illustrates an example file system structure. While file systems may physically be implemented in many different ways, a file system view groups all the files that are accessible to a user, regardless of the physical implementation. Traditionally, such files are seen in a file system tree. By default, all files in the file system tree and all users having access to those files belong to a view called the "root view". A root user, namely a user with root privileges, can create a file system view and associate directories and users with that view.

Figure 4:
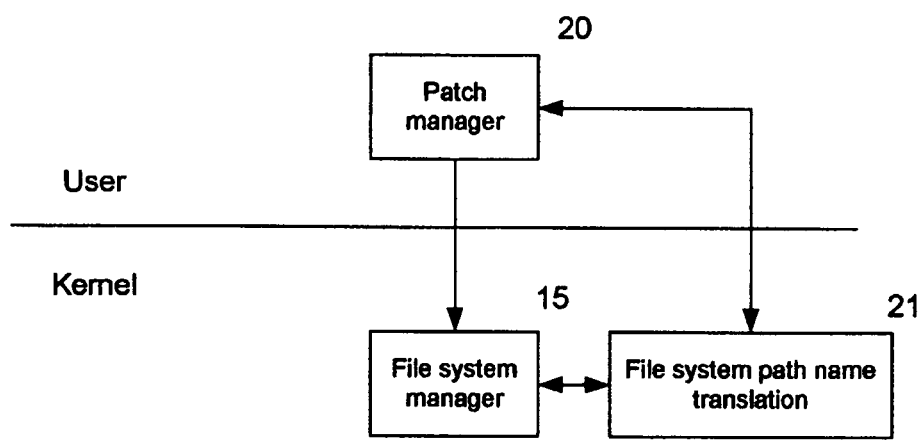
FIG. 4 illustrates a system according for implementing patch management.

FIG. 4 is a schematic diagram of a system comprising a patch manager application 20 at the user level, which is specific to the application to be patched, and a file system path name translation module 21, interacting with the file system manager 15.

Figure 5:
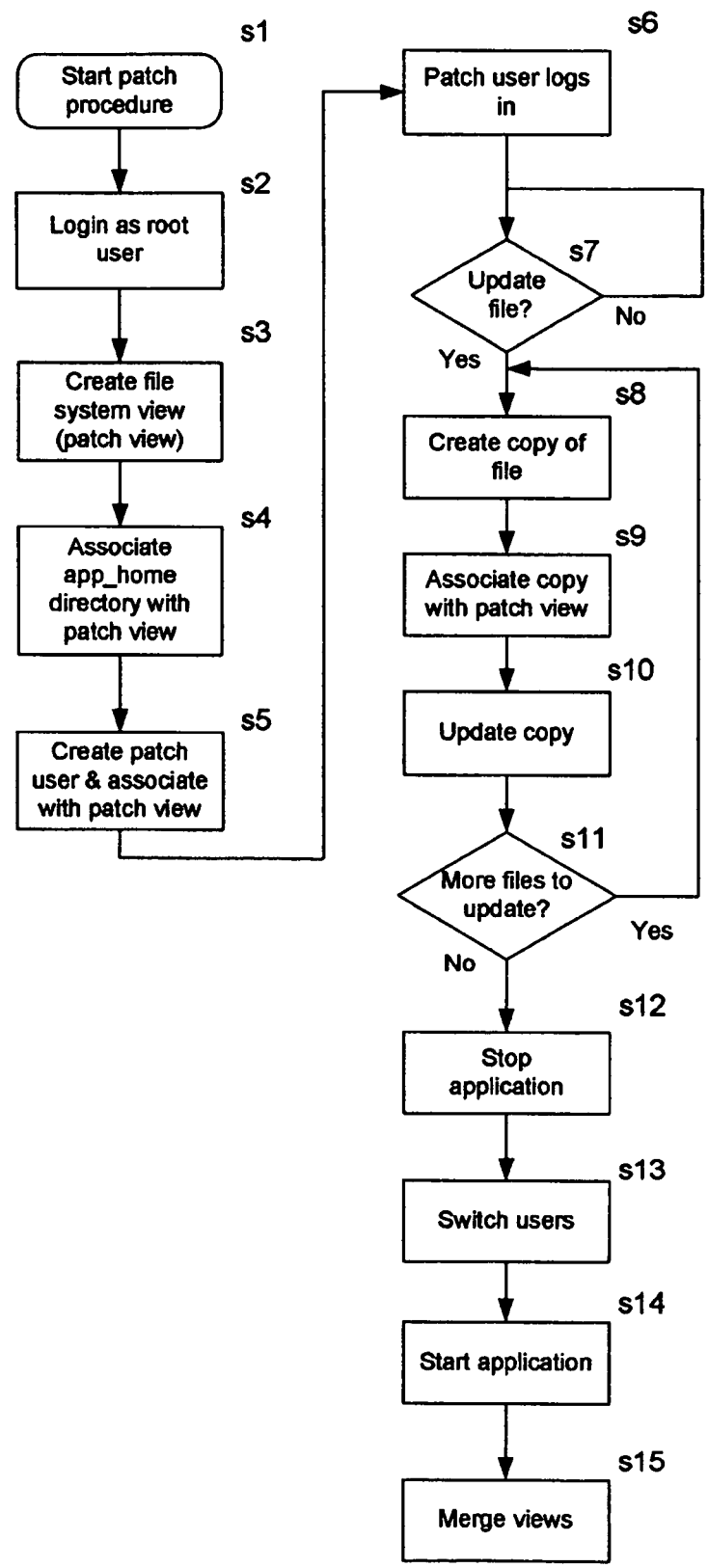
FIG. 5 is a flow diagram illustrating a method of patching an application.

FIG. 5 illustrates a method of patching an application. For the purposes of illustration, we assume that there is a directory holding all of the files for a particular application, referred to herein as the app_home directory. When the application is to be patched (step s1), the patch manager application 20 logs in as a root user (step s2), creates a file system view (step s3) and associates the app_home directory with the view (step s4), which is referred to herein as the patch view. It also creates a user referred to as a patch user and associates it with the view (step s5). The patch user is the user through which all patching of the application will be performed.

The associations between users, views and directories are held in association tables in memory, as shown for example in Tables 1 and 2 below. Table 1 illustrates a User/View association table that relates users to views, while Table 2 illustrates a View/Directory association table that relates views to directories.

TABLE 1

| User name | View name |
|---|---|
| patch | Patch view |
| app_user | Root view |

TABLE 2

| View name | Directory name |
|---|---|
| Patch view | /app_home |
| Root view | / |

Table 1 illustrates two users, a patch user, who is associated with the patch view, and an ordinary user of the application, app_user, who is associated with the root view.

Table 2 illustrates that the patch view is associated with the app_home directory, while the root view is associated with the root directory.

Referring again to FIG. 5, the patch manager application 20 then logs in as the patch user (step s6). At this stage, if the patch user wishes to read a file in the app_home directory, the patch user's access is directed to the appropriate file in the root view.

When the patch user wishes to modify a file (step s7), it opens a file in the app_home directory. However, instead of permitting the file to be written to, the patch manager application creates a copy of the file (step s8), associates the copy with the patch view (step s9), as will be described in detail below, and writes to the copy (step s10). Subsequent read and write operations on that file will be directed to the copy, rather than to the original file.

For example, if the patch user opens the file app.conf, a copy of this file is created in the same directory and is associated with the patch view by being given a name in a reserved file format, which cannot be used by other users. An example format includes the reserved word 'VIEW' and the name of the view. So, for example, the copy of the app.conf file is named '.app.conf..VIEW..patch'.

If there are further files to be patched (step s11), the copying, association and modification procedure (steps s8 to s10) is repeated for each of the files. At the end of the file update procedure, the patch view therefore contains a copy of all modified files, but not unmodified ones, which remain in the root view.

Figure 6:
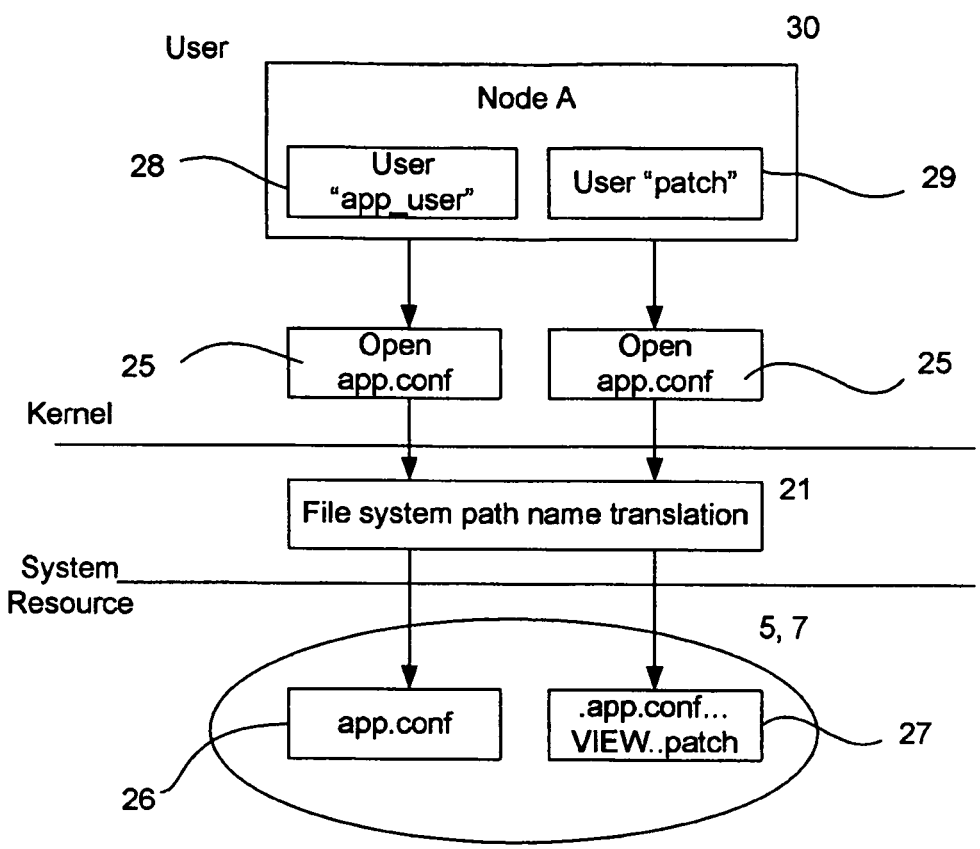
FIG. 6 is a schematic diagram illustrating the process of file system path name translation.

The resulting system is shown in FIG. 6. At the user level, a node A 30, for example a server computer as illustrated in FIG. 1, has two separate users, referred to as user "app_user" 28 and user "patch" 29. When either of the users wishes to access a file, for example, the app.conf file referred to above, they each request access to the file using the access file name app.conf 25, if necessary specifying the path to the file, for example /../app_home/../app.conf.

The file request is passed to the file system path name translation module 21. This looks up the User/View association table and translates the access file name 25 to the appropriate user file depending on the identity of the user 28, 29. For example, for all views other than the root view, the path name translation module 21 looks for a file in the reserved file format having the access file name, the 'VIEW' reserved word and the appropriate view name from the User/View association table. For the root view, the path name translation module provides the original file. For example, the app_user 28 requesting the app.conf file is routed to the app.conf file 26, while the patch user 29 requesting the app.conf file is routed to the .app.conf..VIEW..patch file 27.

If a file does not exist in a particular view corresponding to the requested file, then, the file system path name translation module 21 provides the name of the file from the root view.

Throughout the file update procedure outlined in steps s1 to s11 of FIG. 5 above, the application keeps running, a period during which it would normally be stopped under conventional patch solutions.

Once the file update procedure has finished, the application is stopped (step s12) and all users are switched to use the patch view rather than the root view (step s13).

The application can now be started (step s14), so that the application downtime is only that time required to switch views, which is in the order of a few milliseconds.

Switching views (step s13) involves updating the User/View table. The view name associated with the user is updated with a new view name. The updated User/View table after switching the view is shown below as Table 3.

TABLE 3

| User name | View name |
|---|---|
| Patch | Patch view |
| App_user | Patch view |

At this stage, all users can access the patched application files as well as the unmodified files that remain in the root view.

Figure 7:
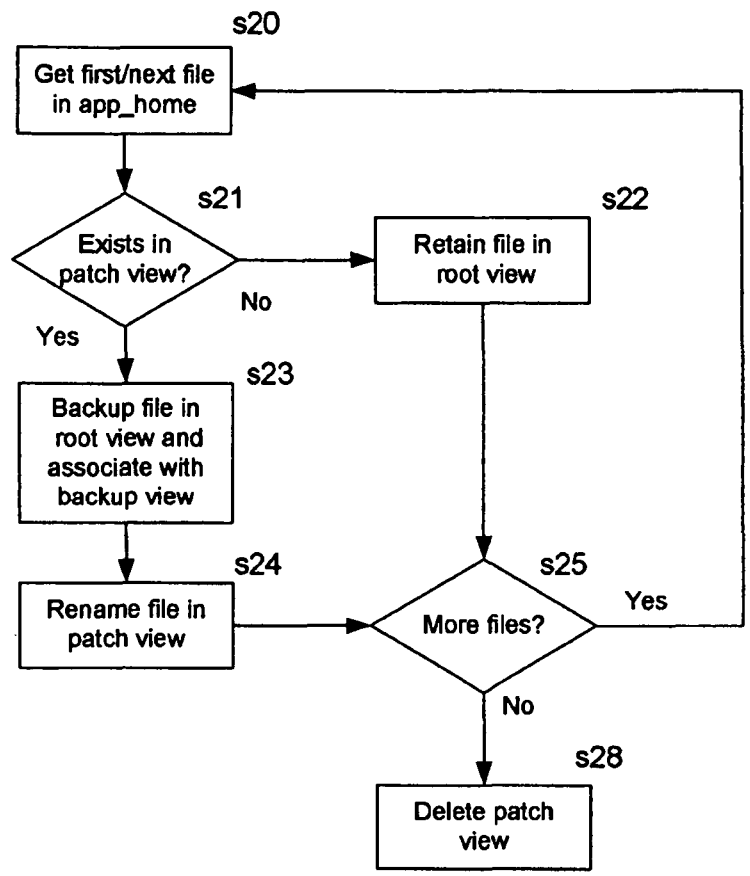
FIG. 7 is a flow diagram illustrating the process of merging file views.

The patch view is then merged with the root view (step s15). The merge process is illustrated in more detail in FIG. 7.

Starting with the first file in the app_home directory (step s20), the patch manager application determines whether the file exists in the patch view (step s21). If not, the root view file is retained (step s22). If the file does exist in the patch view, then the root view file is backed up and associated with a backup view (step s23), for example by renaming the file .[filename]..VIEW..backup1. The patch view file is then renamed back to the file name that was originally associated with the root view (step s24). For example, .app.conf..VIEW..patch is renamed to app.conf.

This process is repeated for all files in the app_home directory (step s25).

At the end of the merge process, the patch view is deleted from the View/Directory table and references to the patch view in the User/View table are changed to root view (step s26).

The form of the User/View and View/Directory tables following the merge process is shown below as Tables 4 and 5.

TABLE 4

| User name | View name |
|---|---|
| Patch | Root view |
| App_user | Root view |

TABLE 5

| View name | Directory name |
|---|---|
| Backup_1 view | /app_home |
| Root view | / |

Figure 8:
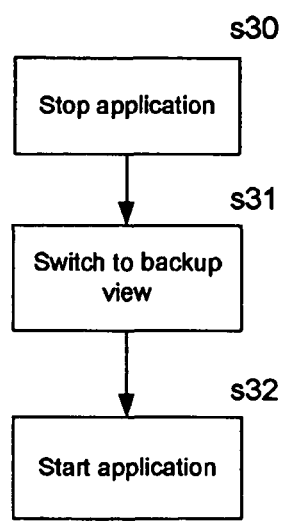
FIG. 8 is a flow diagram illustrating the process of patch roll-back.

The retention of a current version in a backup view enables the patch to be rolled back if any problems occur, as illustrated in FIG. 8, by simply stopping the application (step s30), switching the view to the backup view (step s31) and restarting the application (step s32).

The above described technique permits several patches or updates to be applied to an application, with each previous version being saved in successive backup views. As a result, implementations of the technique permit rapid switching between multiple versions, in addition to simple rollback to a backup version.

Implementations of the technique may be embodied as computer readable code on a medium, such as in ROM, RAM, or on magnetic or optical storage devices, or may be transmissible over a communications network such as the Internet.

While embodiments of the invention have been described by way of example only, modifications and variations falling within the scope of the appended claims would be apparent to one skilled in the art.

The invention claimed is:

1. A method of updating an application that comprises a plurality of files, the files being accessible to a plurality of first users, the method comprising:
   creating, by a processor, a copy of each of the files to be modified while the application is running;
   modifying each of the copies without modifying the plurality of files that have not been copied to enable the application to remain operable and accessible to the plurality of first users during creation and modification of the copies;
   associating the copies with a second user, wherein the association of the copies with the second user enables the second user to access and modify the copies, wherein the second user comprises a patch user for applying updates to the application while the application is running;
   making the plurality of files accessible to the plurality of first users through a first file system view using a path and file name; and
   making the copies of the files accessible to the second user through a second file system view using the path and file name.

2. A method according to claim 1, further comprising:
   making the copies inaccessible to the plurality of first users prior to modification of the copies; and
   making the copies accessible to the plurality of first users following modification of the copies.

3. A method according to claim 2, wherein the step of making the copies accessible to the plurality of first users following modification of the copies further comprises:
   stopping the application;
   associating the modified copies with the plurality of first users; and
   re-starting the application.

4. A method according to claim 1, further comprising: making the copies of the files accessible to the plurality of first users following modification of the copies by switching the file system views, so that the plurality of first users are associated with the second file system view.

5. A method according to claim 4, further comprising merging the first and second file system views.

6. A method according to claim 5, further comprising deleting the second file system view following merger with the first file system view.

7. A method according to claim 5, wherein the step of merging the file system views comprises:
   determining whether a copy of a file exists in the second file system view, and in the event that it does;
   associating the file from which the copy was made with a backup view; and
   associating the copy of the file with the first file system view.

8. A method according to claim 7, wherein the step of associating a file with a view comprises renaming the file to a predetermined file format, the file format specifying the view.

9. A method according to claim 1, wherein making the plurality of files accessible to the plurality of first users and the copies of the files accessible to the second user using the path and file name further comprises translating a file request containing the path and file name into a file name corresponding to one of the plurality of files and the copies of the files in a respective one of the first file system view and the second file system view based upon which of the plurality of first users and the second user submitted the file request.

10. A method of patching an application that comprises a plurality of files, the files being associated with a first file system view, the method comprising:
    associating, by a processor, a plurality of first users of the application with the first file system view; and while the application is running and is accessible to the plurality of first users, executing the steps of:
    creating a copy of each of the files to be patched;
    modifying each of the copies of the files to be patched without modifying the plurality of files that have not been copied to enable the application to remain operable and accessible to the plurality of first users during creating and modification of the copies;
    associating the copies with a second file system view, wherein the association of the copies with the second file system view enables the copies to be accessed and modified while the application is running;
    making the plurality of files accessible to the plurality of first users through the first file system view using a path and file name; and
    making the copies of the files accessible to a second user through the second file system view using the path and file name, wherein the second user comprises a patch user for applying updates to the application while the application is running.

11. A method according to claim 10, further comprising:
stopping the application following modification of the copies;
associating the plurality of first users with the second file system view; and
re-starting the application.

12. A method according to claim 10, wherein making the plurality of files accessible to the plurality of first users and the copies of the files accessible to the second user using the path and file name further comprises translating a file request containing the path and file name into a file name corresponding to one of the plurality of files and the copies of the files in a respective one of the first file system view and the second file system view based upon which of the plurality of first users and the second user submitted the file request.

13. A non-transitory computer readable medium on which is stored computer executable code, said computer executable code implementing a method of updating an application that comprises a plurality of files, the files being accessible to a plurality of first users, said computer executable code comprising:
code for creating a copy of each of the files to be modified while the application is running;
code for modifying each of the copies without modifying the plurality of files that have not been copied to enable the application to remain operable and accessible to the plurality of first users during creation and modification of the copies;
code for associating the copies with a second user, wherein the association of the copies with the second user enables the second user to access and modify the copies, wherein the second user comprises a patch user for applying updates to the application while the application is running;
code for making the plurality of files accessible to the plurality of first users through a first file system view using a path and file name; and
code for making the copies of the files accessible to the second user through a second file system view using the path and file name;
code for receiving a request for a file; and
code for translating the file request into a file name corresponding to one of the plurality of files and the copies of the files in a respective file system view in dependence on the user name associated with the file request.

* * * * *